(12) United States Patent
Millar et al.

(10) Patent No.: US 8,181,313 B2
(45) Date of Patent: *May 22, 2012

(54) RETROFITTABLE HOOK DEVICE

(75) Inventors: Richard H. Millar, Silverwater (AU); Robin A. Sannes, Minneapolis, MN (US)

(73) Assignee: Capital Safety Group (Australia) Pty Limited, Sydney (AU)

( * ) Notice: Subject to any disclaimer, the term of this patent is extended or adjusted under 35 U.S.C. 154(b) by 494 days.

This patent is subject to a terminal disclaimer.

(21) Appl. No.: 12/368,590

(22) Filed: Feb. 10, 2009

(65) Prior Publication Data

US 2010/0199471 A1    Aug. 12, 2010

(51) Int. Cl.
A44B 13/00    (2006.01)
(52) U.S. Cl. .................... 24/265 H; 24/302
(58) Field of Classification Search .......... 24/265 H, 24/265 R, 265 EC, 265 B, 265 C, 265 A, 24/302, 300, 301, 265 BC
See application file for complete search history.

(56) References Cited

U.S. PATENT DOCUMENTS

| | | | | |
|---|---|---|---|---|
| 3,686,711 | A * | 8/1972 | Kuramoto et al. | 16/445 |
| 4,464,813 | A | 8/1984 | Bakker et al. | |
| 4,977,647 | A | 12/1990 | Casebolt | |
| 4,991,689 | A | 2/1991 | Cole | |
| 5,368,281 | A * | 11/1994 | Skyba | 254/391 |
| 5,384,943 | A * | 1/1995 | LeFebvre et al. | 24/600.1 |
| 5,669,119 | A * | 9/1997 | Seron | 24/265 H |
| 5,915,630 | A * | 6/1999 | Step | 24/115 K |
| 6,068,242 | A * | 5/2000 | Kingery | 254/391 |
| 6,070,308 | A | 6/2000 | Rohlf | |
| 6,092,791 | A * | 7/2000 | Kingery | 254/371 |
| 6,149,133 | A | 11/2000 | Skyba | |
| 6,938,306 | B2 * | 9/2005 | Joubert et al. | 24/300 |
| 7,036,189 | B2 * | 5/2006 | Steigerwald | 24/300 |
| 7,111,572 | B1 * | 9/2006 | Yang | 114/199 |
| 7,228,600 | B1 * | 6/2007 | Selby et al. | 24/300 |
| 7,287,303 | B2 * | 10/2007 | Yang | 24/134 R |
| 7,445,195 | B1 * | 11/2008 | Huang | 254/391 |
| 7,537,199 | B1 | 5/2009 | Anderson | |

(Continued)

FOREIGN PATENT DOCUMENTS

AU    2003203691 A1    11/2004
(Continued)

OTHER PUBLICATIONS

International Search Report from Serial No. PCT/US2009/064095, mailed Jan. 5, 2010.

(Continued)

Primary Examiner — Robert J Sandy
Assistant Examiner — Abigail E Morrell
(74) Attorney, Agent, or Firm — IPLM Group, P.A.

(57) ABSTRACT

A retrofittable hook protection device for use with a hook comprises a first member and a second member. The hook includes an intermediate portion interconnecting a hook portion and an end having an aperture, a gate for opening and closing an opening proximate the hook portion, and a lanyard operatively connected to the end proximate the aperture. The first member is configured and arranged to receive a first portion of the lanyard and a second portion of the end proximate a first side of the hook. The second member is configured and arranged to receive a third portion of the lanyard and a fourth portion of the end proximate a second side of the hook. The first and second members are connectable to sandwich the portions of the lanyard and the end therebetween.

15 Claims, 5 Drawing Sheets

U.S. PATENT DOCUMENTS

| | | | |
|---|---|---|---|
| 7,562,862 | B1 | 7/2009 | Jackson |
| 7,971,269 | B2 * | 7/2011 | Buckley ............................ 2/22 |
| 2007/0062014 | A1 | 3/2007 | Casebolt |
| 2010/0199472 | A1 * | 8/2010 | Millar et al. ................. 24/599.1 |

FOREIGN PATENT DOCUMENTS

| | | |
|---|---|---|
| EP | 0 004 586 | 10/1979 |
| EP | 0 004 586 A2 | 10/1979 |
| JP | 2008086738 A * | 4/2008 |

OTHER PUBLICATIONS

DBI SALA,EZ-Stop It Tie-Back Lanyards, Single Leg Model 1241124, Form 9700275 rev: A. www.capitalsafety.com.

Monadelphous HSE Alert, Alert No. A68, MGL-PRO-189 HSE Alerts & Bulletins Procedure, Sep. 18, 2008.

Non-Final Office Action for U.S. Appl. No. 12/576,875 mailed Dec. 21, 2011, 15 pages.

* cited by examiner

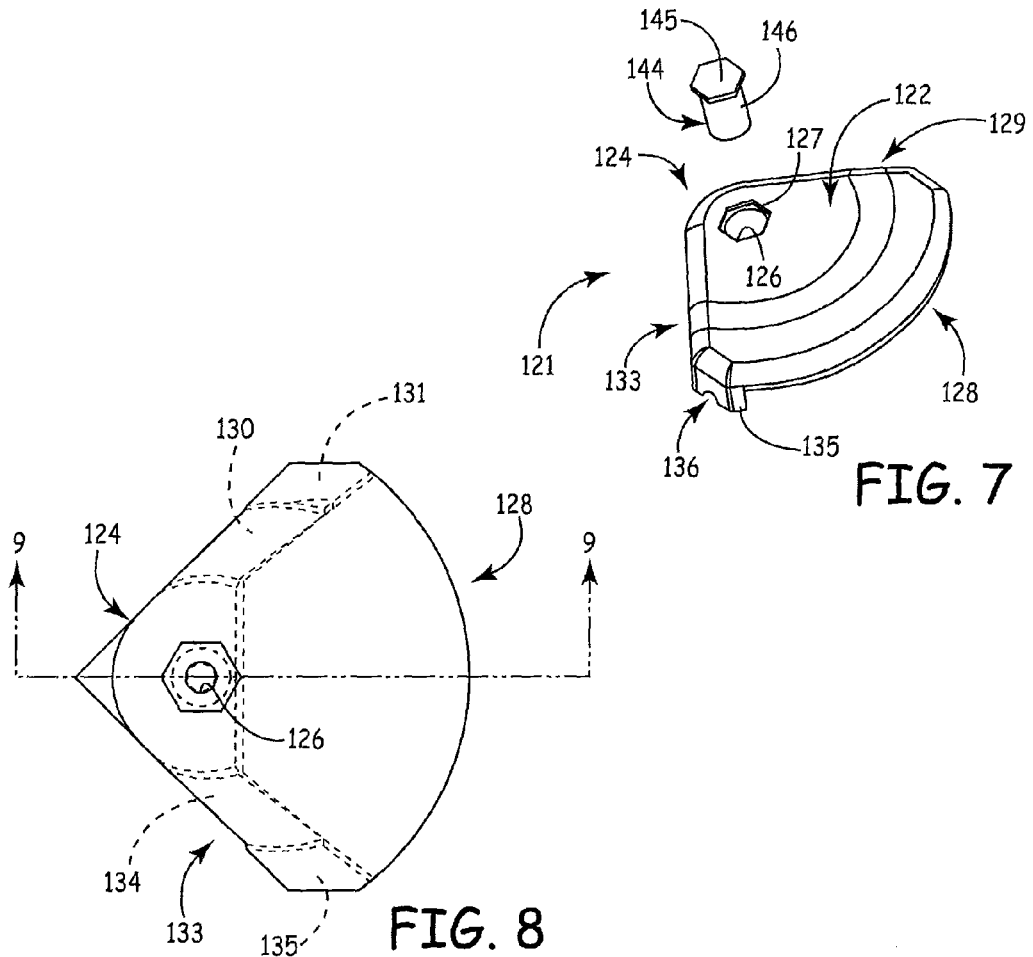
FIG. 7
FIG. 8
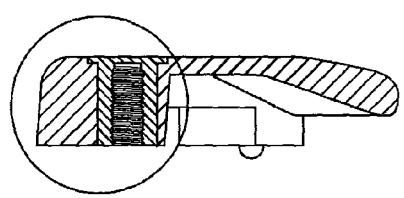
FIG. 9
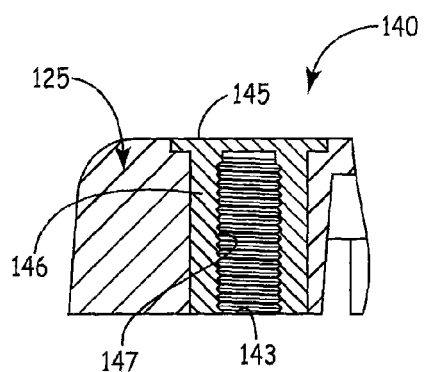
FIG. 10

RETROFITTABLE HOOK DEVICE

FIELD OF THE INVENTION

The present invention relates to a retrofittable hook device.

BACKGROUND

A lanyard is commonly used by a worker to interconnect a support structure and a safety harness donned by the worker. The lanyard is commonly connected to the support structure with a hook operatively connected to an end of the lanyard. The hook is commonly directly connected to an anchorage member operatively connected to the support structure or the lanyard is wrapped about the support structure and the hook engages the lanyard (commonly referred to as a "tie-back" lanyard). The lanyard could also include a shock absorber to reduce the amount of force exerted upon the worker should a fall occur.

"Roll-out" could occur when the lanyard or the shock absorber contacts or engages the hook and inadvertently allows the hook's gate to open, which allows the anchorage member or the tied-back portion of the lanyard to be released from the hook. Should roll-out occur, the worker is no longer connected to the support structure and should a fall occur, the consequences could be life-threatening.

Another life-threatening situation could occur if one worker unintentionally disconnects another worker's lanyard.

For the reasons stated above and for other reasons stated below, which will become apparent to those skilled in the art upon reading and understanding the present specification, there is a need in the art for a hook protection device to reduce the risk of roll-out.

SUMMARY

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a retrofittable hook protection device for use with a hook comprises a first member and a second member. The hook includes an intermediate portion interconnecting a hook portion and an end having an aperture, a gate for opening and closing an opening proximate the hook portion, and a lanyard operatively connected to the end proximate the aperture. The first member is configured and arranged to receive a first portion of the lanyard and a second portion of the end proximate a first side of the hook. The second member is configured and arranged to receive a third portion of the lanyard and a fourth portion of the end proximate a second side of the hook. The first and second members are connectable to sandwich the portions of the lanyard and the end therebetween.

In one embodiment, a retrofittable hook protection device for use with a hook comprises a first portion, a second portion, and a fastener. The hook includes an intermediate portion interconnecting a hook portion and an end having an aperture, a gate for opening and closing an opening proximate the hook portion, and a lanyard operatively connected to the end proximate the aperture. The first portion has a first top extension portion, a first side extension portion, and a second side extension portion. The first top extension portion and the first side extension portion form a first notch, and the first top extension portion and the second side extension portion form a second notch. The second portion has a second top extension portion, a third side extension portion, and a fourth side extension portion. The second top extension portion and the third side extension portion form a third notch, and the second top extension portion and the fourth side extension portion form a fourth notch. The fastener interconnects the first top extension portion and the second top extension portion. The first top extension portion and the second top extension portion are configured and arranged to extend into the aperture proximate opposing sides of the hook. The notches accommodate portions of the end proximate the aperture and the lanyard. The first and second portions define a cavity in which a portion of the lanyard is positioned proximate the end of the hook. The first side extension portion and the third side extension portion are configured and arranged to mate proximate one side of the lanyard, and the second side extension portion and the fourth side extension portion are configured and arranged to mate proximate another side of the lanyard. The first and second portions assist in preventing the lanyard from contacting the hook and allowing the gate to open inadvertently.

In one embodiment, a method of protecting a hook from roll-out, the hook being operatively connected to a lanyard proximate an end of the hook, comprises sandwiching a first portion of the lanyard and a second portion of the end between a first member and a second member, and connecting the first and second members.

In one embodiment, a method of retrofitting a lanyard including a hook with a color-coded indicator comprises selecting a first lanyard including a first hook. The first hook includes an intermediate portion interconnecting a hook portion and an end having an aperture. The first hook includes a gate for opening and closing an opening proximate the hook portion. The first lanyard is operatively connected to the end proximate the aperture. First and second members having a first color are selected, and the first and second members are connected. The first member is configured and arranged to receive a first portion of the first lanyard and a second portion of the end proximate a first side of the first hook, and the second member is configured and arranged to receive a third portion of the first lanyard and a fourth portion of the end proximate a second side of the first hook. The first and second members are connectable to sandwich the portions of the first lanyard and the end of the first hook therebetween.

BRIEF DESCRIPTION OF THE DRAWINGS

The present invention can be more easily understood, and further advantages and uses thereof can be more readily apparent, when considered in view of the detailed description and the following Figures in which:

FIG. 7 is a perspective view of a second portion of the hook protection device shown in FIG. 1;

FIG. 8 is a top view of the second portion shown in FIG. 7;

FIG. 9 is a cross section view of the second portion taken along the line 9-9 in FIG. 8;

FIG. 10 is a section of the second portion from FIG. 9;

In accordance with common practice, the various described features are not drawn to scale but are drawn to emphasize specific features relevant to the present invention. Reference characters denote like elements throughout the Figures and the text.

DETAILED DESCRIPTION OF A PREFERRED EMBODIMENT

In the following detailed description, reference is made to the accompanying drawings, which form a part hereof, and in which is shown by way of illustration embodiments in which the invention may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Figure 2:
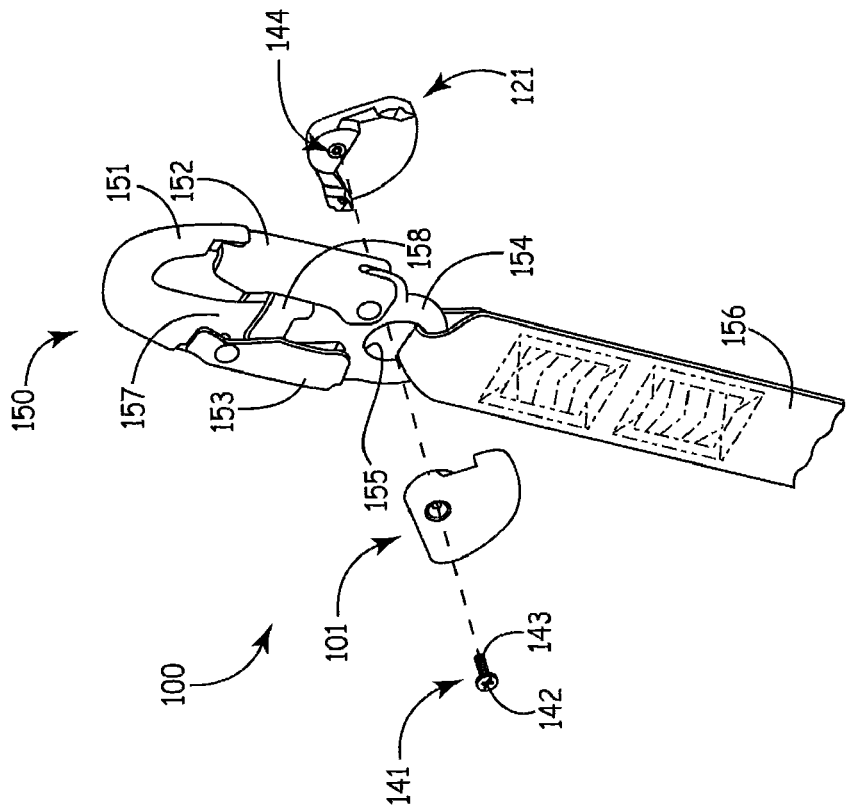
FIG. 2 is an exploded perspective view of the hook protection device and a perspective view of the lanyard with the hook shown in FIG. 1.
Figure 1:
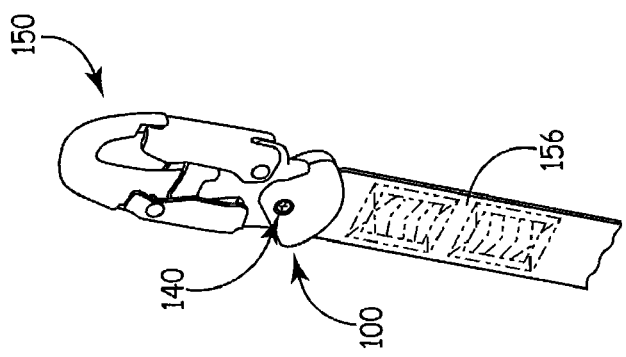
FIG. 1 is a perspective view of a hook protection device operatively connected to a lanyard with a hook.

One embodiment hook protection device constructed in accordance with the principles of the present invention is designated by the numeral 100 in FIGS. 1 and 2. The hook protection device 100 is retrofittable for use with a variety of different lanyards including hooks. The word "lanyard" could mean a lanyard or other suitable type of lifeline made of webbing or other suitable type of material. One example of a suitable hook that could be used with the present invention is also shown in FIGS. 1 and 2. The hook 150 includes an intermediate portion 157 interconnecting a hook portion 151 and an end 154. A gate 152 is pivotally connected to the hook body proximate the intermediate portion 157 and the end 154, and the gate 152 pivots to open and close the opening of the hook portion 151. An actuator 153 is pivotally connected to a lock 158 and the hook body proximate the intermediate portion 157 and the hook portion 151. The lock 158 extends outward from the actuator 153 and reinforces the gate 152 in the locked position. In this hook 150, the actuator 153 is pivoted, which pivots the lock 158 and allows the gate to be pivoted from the locked position to an unlocked position. The gate 152 and the lock 158 are spring biased in the locked position. The end 154 includes an aperture or eye 155 through which an end of a lanyard 156 made of webbing is inserted, folded back onto itself, and secured with stitching. A shock absorber (not shown) could be operatively connected to the webbing proximate the end 154 of the hook 150.

Although any suitable type of hook could be used, examples of suitable hooks that could be used are hooks manufactured by DBI/SALA of Red Wing, Minn., hooks disclosed in U.S. Pat. No. 4,977,647; U.S. Pat. No. 6,070,308; and U.S. Patent Application Publication No. US 2007/0062014, and other suitable types of hooks.

The hook protection device 100 includes a first portion 101 and a second portion 121 that are releasably connectable proximate where the lanyard connects to the hook to protect the gate from being inadvertently opened.

Figure 3:
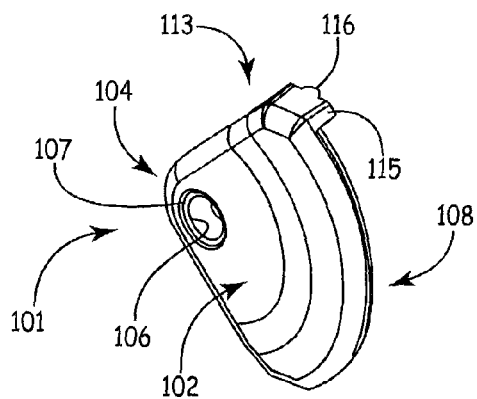
FIG. 3 is a perspective view of a first portion of the hook protection device shown in FIG. 1.
Figure 4:
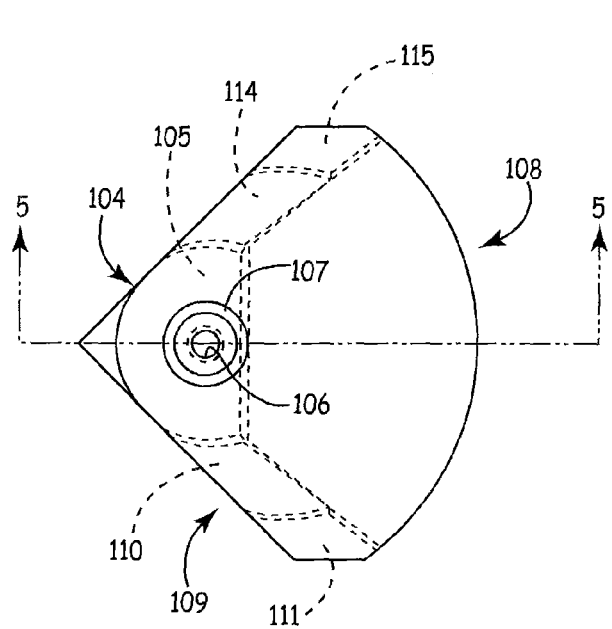
FIG. 4 is a top view of the first portion shown in FIG. 3.
Figure 5:
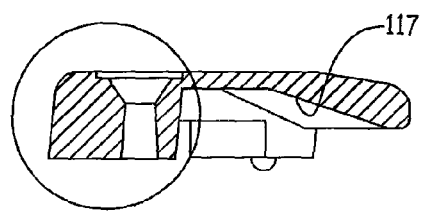
FIG. 5 is a cross section view of the first portion taken along the lines 5-5 in FIG. 4.
Figure 6:
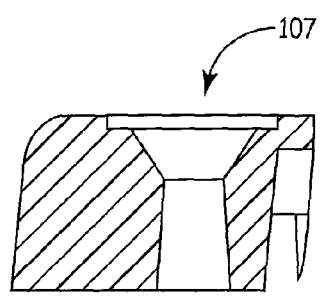
FIG. 6 is a section of the first portion from FIG. 5.
Figure 11:
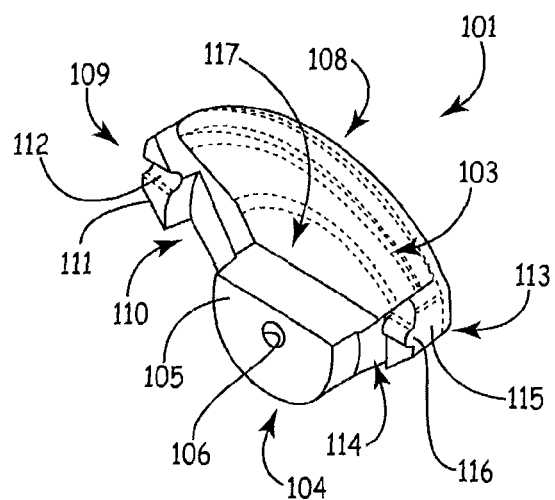
FIG. 11 is a perspective view of the first portion shown in FIG. 3 showing an inner surface.

The first portion 101 includes an outer surface 102, shown in FIG. 3, and an inner surface 103, shown in FIG. 11. The inner surface 103 faces the lanyard and the hook. The first portion 101 also includes a top 104, a bottom 108, a first side 109, and a second side 113. Extending outward from the inner surface 103 proximate the top 104 and the sides 109 and 113 is an extension portion 105 through which a bore 106 extends to the outer surface 102. The bore 106 includes a countersunk portion 107 proximate the outer surface 102.

Proximate the bottom 108, the first side 109 includes a first side extension portion 111 extending outward from the inner surface 103. The first side 109 includes a notch 110 between the first side extension portion 111 and the extension portion 105. The first side extension portion 111 includes a receiving notch 112.

Proximate the bottom 108, the second side 113 includes a second side extension portion 115 extending outward from the inner surface 103. The second side 113 includes a notch 114 between the second side extension portion 115 and the extension portion 105. The second side extension portion 115 includes a protrusion 116 extending outward therefrom.

Figure 12:
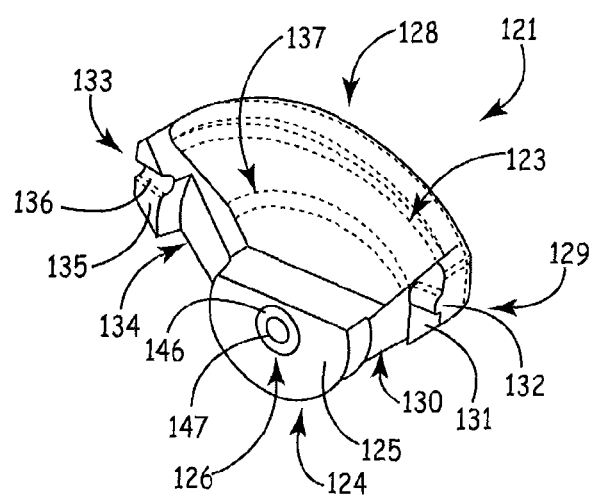
FIG. 12 is a perspective view of the second portion shown in FIG. 7 showing an inner surface.

The second portion 121 includes an outer surface 122, shown in FIG. 7, and an inner surface 123, shown in FIG. 12. The inner surface 123 faces the lanyard and the hook. The second portion 121 also includes a top 124, a bottom 128, a first side 129, and a second side 133. Extending outward from the inner surface 123 proximate the top 124 and the sides 129 and 133 is an extension portion 125 through which a bore 126 extends. The bore 126 includes a countersunk portion 127 proximate the outer surface 122. The countersunk portion 127 is hexagonal-shaped.

Proximate the bottom 128, the first side 129 includes a first side extension portion 131 extending outward from the inner surface 123. The first side 129 includes a notch 130 between the first side extension portion 131 and the extension portion 125. The first side extension portion 131 includes a protrusion 132 extending outward therefrom.

Proximate the bottom 128, the second side 133 includes a second side extension portion 135 extending outward from the inner surface 123. The second side 133 includes a notch 134 between the second side extension portion 135 and the extension portion 125. The second side extension portion 135 includes a receiving notch 136.

When the inner surfaces 103 and 123 are facing one another and the first and second portions 101 and 121 are put together, the bores 106 and 126 of the first portion 101 and the second portion 121 align and the protrusions 116 and 132 mate with the receiving notches 136 and 112, respectively. The inner surface 103 of the first portion 101 includes a cavity 117 between the extension portions 105, 111, and 115; and the inner surface 123 of the second portion 121 includes a cavity 137 between the extension portions 125, 131, and 135. The notches 110 and 130, the notches 114 and 134, and the bottoms 108 and 128 form openings providing access to the cavities 117 and 137, which form a single cavity between the portions 101 and 121.

A fastener is inserted through the bores 106 and 126 to interconnect the first portion 101 and the second portion 121. An example of a suitable fastener is a two-piece fastener 140. The first portion 141 includes a head 142 operatively connected to a threaded shaft 143. The second portion 144 includes a head 145, which is preferably hexagonal, operatively connected to a shaft 146 with a threaded bore 147 extending longitudinally therethrough. The threaded bore 147 is configured and arranged to mate with the threaded shaft 143 and connect the first and second portions 141 and 144. Thus, the hexagonal head 145 fits within the countersunk portion 127 of the second portion 121, which prevents the fastener's second portion 144 from rotating, and the shaft 146 extends through the bore 126. The threaded shaft 143 is inserted through the bore 106 of the first portion 101, and a screwdriver is used to rotate the fastener's first portion 141 to mate the threaded shaft 143 with the threaded bore 147. The fastener 140 keeps the first and second portions 101 and 121 together and the mating protrusions 116 and 132 and receiving notches 136 and 112, respectively, prevent the first and second portions 101 and 121 from rotating about the fastener 140. The fastener could also be a screw, a rivet, a bolt and a nut, mating snaps, and other suitable types of fasteners.

The device 100 is retrofittable and reusable, and the device 100 could be added to a variety of different webbing lanyards with hooks. For example, the device 100 could be used with lanyards made of webbing of varying widths such as 25 millimeters, 45 millimeters, and 50 millimeters. The pattern of the stitching on the lanyard's webbing should not affect the operation of the device 100. The device 100 could also be used with rope, wire, cable, or other types of lanyards. Depending upon the type of lanyard, it is recognized that some modification may be needed to accommodate the lanyard.

To connect the device 100 to a lanyard with a hook, the first and second portions 101 and 102 are positioned so that their inner surfaces 103 and 123 face each other and the top extension portions 105 and 125 are inserted into the hook's aperture 155 from opposing sides of the hook with the bottoms of the top extension portions 105 and 125 positioned proximate the lanyard. The top extension portions 105 and 125 preferably fill-in a majority of the aperture 155. The respective mating protrusions 116 and 132 and receiving notches 136 and 112 are positioned on opposing sides of the lanyard and connected and the bores 106 and 126 of the top extension portions 105 and 125 are aligned. The portions of the lanyard and the end of the hook are sandwiched between the first and second portions 101 and 121, and the lanyard extends through the opening between the bottoms 108 and 128. At least one of the fastener's portions is inserted through the bores 106 and 126 to secure the first and second portions 101 and 121 together. The second portion 144 of the fastener 140 could be glued or otherwise connected to the second portion 121. Thus, only the first portion 141 may need to be inserted through the bores 106 and 126.

Generally, the device 100 assists in preventing the webbing from moving on the hook's end, contacting the hook's actuator, and allowing the gate to open inadvertently, which reduces the risk of roll-out. More specifically, the device 100 prevents the webbing from contacting the hook's actuator by substantially filling-in the remaining space in the hook's aperture with the top extension portions 105 and 125 and by forming a tight fit against the webbing and the hook's end to which the webbing is connected. The two portions 101 and 121 clamp down and place pressure on the webbing and the hook's end to hold the webbing firmly against the hook's end and so doing limits the movement of the webbing on the hook's end, which assists in preventing the webbing from contacting the hook's actuator. The fastener 140 assists in securing the two portions 101 and 121 together to form the tight fit against the webbing and the hook's end. Without the device 100, should the webbing rotate on the hook's eye and contact the actuator of the hook, the gate could then be opened and allow for roll-out, which is the unintentional disengagement of the hook from the connecting point.

The device 100 is could be made of a clear, high impact plastic to enable inspection of the webbing without removing the device 100. The device 100 also preferably includes a UV protective coating. The first and second portions 101 and 121 are releasably connectable and reusable.

Figure 13:
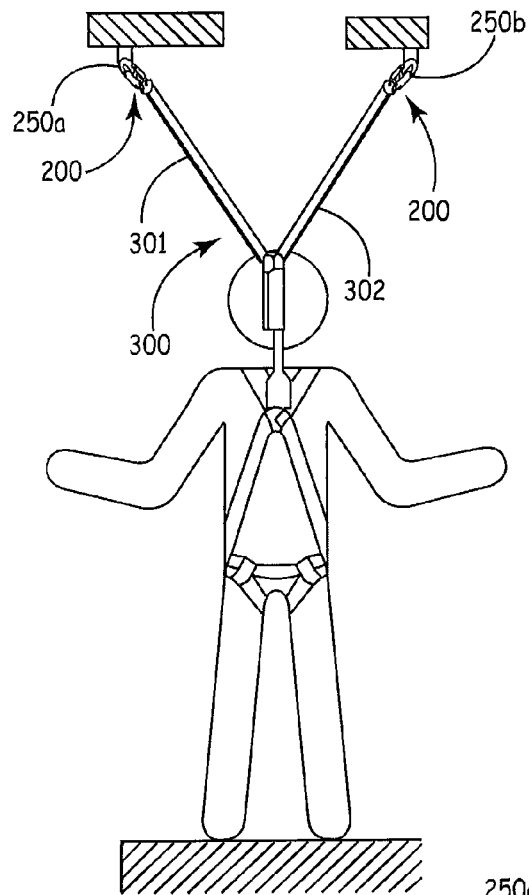
FIG. 13 illustrates a worker connected to a support structure with both legs of a twin leg lanyard.
Figure 14:
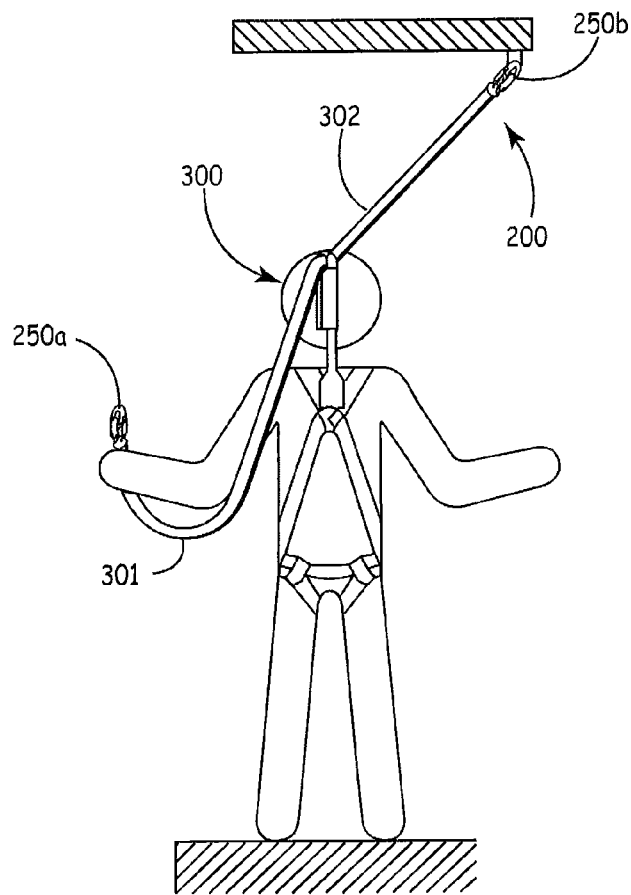
FIG. 14 illustrates a worker connected to a support structure with one leg of a twin leg lanyard.

Another embodiment hook device 200 could be made of various colors to color-code hooks connected to lanyards, in which case the device 200 could be similarly constructed as device 100, but device 200 would not need to substantially fill-in the remaining space in the hook's aperture with the top extension portions or form a tight fit against the lanyard and the hook's end to which the lanyard is connected. For example, as shown in FIGS. 13 and 14, the device 200 could be connected to the hooks 250a and 250b operatively connected to first and second legs 301 and 302, respectively, of a twin leg lanyard 300 as a color-coded indicator. As shown in FIGS. 13 and 14, a worker is using the twin leg lanyard 300 to "leapfrog" from one support structure to another. An example of a suitable twin leg lanyard is the SHOCKWAVE™ 2 twin leg lanyard by DBI/SALA of Red Wing, Minn. The device 200 could also be connected to the hooks of a self-retracting lifeline such as the TALON™ twin leg self-retracting lifeline by DBI/SALA of Red Wing, Minn.

One possible situation in which using color-coding is helpful is when two or more workers are performing tasks in relatively close proximity and there is a risk one worker could unintentionally disconnect the other worker's lanyard. In such a situation, one worker could use one color and the other worker could use another color to avoid any possible confusion.

The above specification, examples, and data provide a complete description of the manufacture and use of the composition of embodiments of the invention. Since many embodiments of the invention can be made without departing from the spirit and scope of the invention, the invention resides in the claims hereinafter appended.

We claim:

1. A retrofittable hook protection device and a hook, the hook including an intermediate portion interconnecting a hook portion and an end having an aperture, a gate for opening and closing an opening proximate the hook portion, and a lanyard operatively connected to the end proximate the aperture, comprising:
    a first member configured and arranged to receive a first portion of the lanyard and a second portion of the end proximate a first side of the hook;
    a second member configured and arranged to receive a third portion of the lanyard and a fourth portion of the end proximate a second side of the hook;
    wherein the first and second members are connectable to sandwich the portions of the lanyard and the end therebetween; and
    at least one top extension portion coupled to one of the first and second members, the at least one top extension member received in the aperture of the end of the hook with a portion of the lanyard that couples the lanyard to the hook.

2. The retrofittable hook protection device and hook of claim 1, wherein the first and second members are configured and arranged to apply pressure on the portions of the lanyard and the end thereby assisting in preventing the lanyard from moving on the end, coming into contact with the hook, and allowing the gate of the hook to open inadvertently.

3. The retrofittable hook protection device and hook of claim 1, wherein the at least one top extension portion includes a first top extension portion coupled to the first member and a second top extension portion coupled to the second member.

4. The retrofittable hook protection device and hook of claim 3, wherein the first and second members are connected proximate the top extension portions.

5. The retrofittable hook protection device and hook of claim 1, wherein the at least one top extension portion fills-in a majority of the aperture and limit movement of the lanyard on the end of the hook.

6. The retrofittable hook protection device and hook of claim 1, wherein the first and second members are releasably connectable and reusable.

7. The retrofittable hook protection device and hook of claim 1, wherein the first and second members are connected with a fastener.

8. The retrofittable hook protection device and hook of claim 7, wherein the fastener is selected from the group consisting of a screw, a rivet, a bolt and a nut, and mating snaps.

9. The retrofittable hook protection device and hook of claim 7, wherein the first and second members are colored.

10. A retrofittable hook protection device for use with a hook, the hook including an intermediate portion interconnecting a hook portion and an end having an aperture, a gate for opening and closing an opening proximate the hook portion, and a lanyard operatively connected to the end proximate the aperture, comprising:
   a first portion having a first top extension portion, a first side extension portion, and a second side extension portion, the first top extension portion and the first side extension portion forming a first notch, the first top extension portion and the second side extension portion forming a second notch;
   a second portion having a second top extension portion, a third side extension portion, and a fourth side extension portion, the second top extension portion and the third side extension portion forming a third notch, the second top extension portion and the fourth side extension portion forming a fourth notch;
   a fastener interconnecting the first top extension portion and the second top extension portion;
   wherein the first top extension portion and the second top extension portion are configured and arranged to extend into the aperture proximate opposing sides of the hook, the notches accommodating portions of the end proximate the aperture and the lanyard, the first and second portions defining a cavity in which a portion of the lanyard is positioned proximate the end of the hook, the first side extension portion and the third side extension portion are configured and arranged to mate proximate one side of the lanyard, the second side extension portion and the fourth side extension portion are configured and arranged to mate proximate another side of the lanyard, and wherein the first and second portions assist in preventing the lanyard from contacting the hook and allowing the gate to open inadvertently.

11. The retrofittable hook protection device of claim 10, wherein the first side extension portion includes a first receiving notch and the third side extension portion includes a first protrusion, the second side extension portion includes a second protrusion and the fourth side extension portion includes a second receiving notch, the first protrusion mating with the first receiving notch, and the second protrusion mating with the second receiving notch.

12. The retrofittable hook protection device of claim 10, wherein the first and second portions exert pressure on the portion of the lanyard proximate the end of the hook to provide resistance of movement of the lanyard on the end.

13. The retrofittable hook protection device of claim 10, wherein the top extension portions fill-in a majority of the aperture and limit movement of the lanyard on the end of the hook.

14. The retrofittable hook protection device of claim 10, wherein the fastener is selected from the group consisting of a screw, a rivet, a bolt and a nut, and mating snaps.

15. The retrofittable hook protection device of claim 10, further comprising:
   a first bore in the first top extension portion;
   a second bore in the second top extension portion, the first and second bores being aligned;
   the fastener including a first fastener portion and a second fastener portion, the first fastener portion includes a threaded shaft, the second fastener portion includes a shaft with a threaded bore, the threaded bore being configured and arranged to mate with the threaded shaft; and
   the first fastener portion being configured and arranged to extend through the first bore and the second fastener portion being configured and arranged to extend through the second bore, the first and second fastener portions interconnecting the first and second top extension portions.

* * * * *